No. 668,192. Patented Feb. 19, 1901.
J. KRODER.
CURTAIN POLE RING.
(Application filed May 19, 1900.)
(No Model.)

WITNESSES:
William P. Goebel
Geo. G. Hoster

INVENTOR
John Kroder.
BY
Munn
ATTORNEYS

THE NORRIS PETERS CO., PHOTO-LITHO., WASHINGTON, D. C.

UNITED STATES PATENT OFFICE.

JOHN KRODER, OF NEW YORK, N. Y., ASSIGNOR TO J. KRODER & H. REUBEL COMPANY, OF SAME PLACE.

CURTAIN-POLE RING.

SPECIFICATION forming part of Letters Patent No. 668,192, dated February 19, 1901.

Application filed May 19, 1900. Serial No. 17,281. (No model.)

*To all whom it may concern:*

Be it known that I, JOHN KRODER, a citizen of the United States, and a resident of the city of New York, borough of Manhattan, in the county and State of New York, have invented a new and Improved Curtain-Pole Ring, of which the following is a full, clear, and exact description.

The object of the invention is to provide a new and improved curtain-pole ring which is simple and durable in construction, cheap to manufacture, has a highly-finished appearance, and is arranged to securely hold the ends of the split ring in position in the hub of the eye without the use of solder or other similar fastening means.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1:
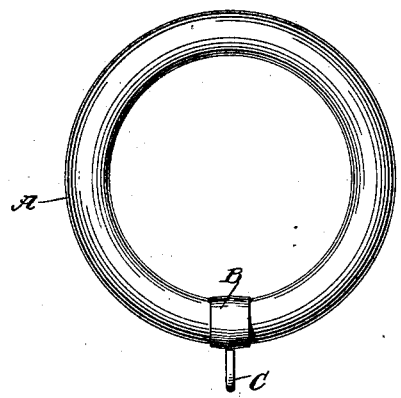
Figure 2:
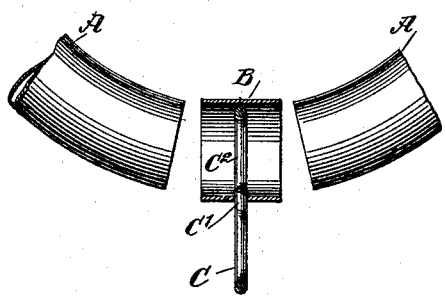
Figure 3:
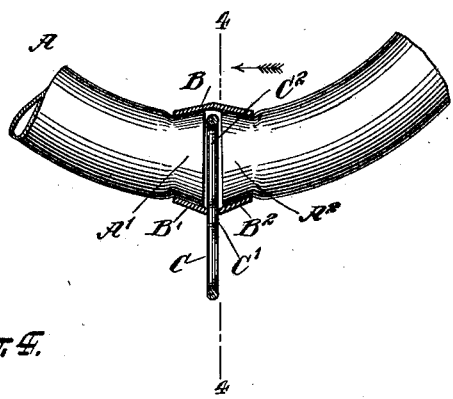
Figure 4:
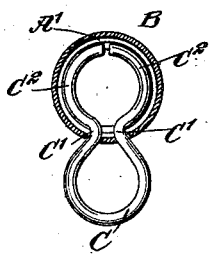

Figure 1 is a face view of the improvement. Fig. 2 is a side elevation of the ends of the split ring with the eye and its hub appearing between the said ends and in sectional elevation. Fig. 3 is a like view of the same with the parts assembled and secured in position, and Fig. 4 is a transverse section of the same on the line 4 4 in Fig. 3.

The improved curtain-pole ring consists, essentially, of a split ring A, made of tubular material and formed at its ends with retaining-heads A' A², shaped as frustums of cones and embraced by the tapering walls B' B² of the hub B, carrying an eye C, extending in a transverse direction, as indicated in the drawings.

In making the curtain-pole ring the hub B, of cylindrical shape, receives the corresponding ends of the split ring A, and then by the use of suitable tools pressure is exerted on the exterior surface of the hub B, so that the ends of said hub are contracted and firmly engage with the ends of the split ring A and at the same time form the said ends into the retaining-heads A' A², as is plainly indicated in Fig. 3, to hold said retaining-heads against outward movement, so that the ring cannot open, it being understood that the hub is made tapering at its ends, and the heads are formed in the shape of frustums of cones by hand, swaging, or a compressing operation by the use of suitable tools or machines.

It is evident from the foregoing that the outwardly-tapering ends or walls of the hub B tightly embrace the retaining-heads A' A² to securely close the ring and to positively prevent the ends of the ring from becoming disengaged from the hub. The eyes C may form an integral part of the hub B or they may be made of a separate piece of wire or other material. As shown in the drawings, the ends C' of the eye extend through spaced apertures in the hub B at the middle thereof, the inner extreme ends C² being bent in opposite directions along the inner surface of the hub B, so as to provide a stop for the adjacent ends of the split ring A when the said ends are inserted from opposite directions into the hub B previous to the swaging or compressing operation to insure a uniform formation of the retaining-heads and a corresponding tapering of the ends of the hub B.

By the arrangement described the curtain-pole ring can be cheaply manufactured and at the same time produce a ring having a highly-finished appearance.

Having thus described my invention, I claim as new and desire to secure by Letters Patent—

1. A curtain-pole ring, comprising a split ring, and a hub for engagement with the ends of the split ring, said ends having integral retaining-heads shaped as frustums of cones, and said hub having its ends tapered outwardly, the walls of said ends being contracted and reduced upon the ends of the split ring to tightly embrace the retaining-heads and thereby prevent the split ring from opening, as set forth.

2. A curtain-pole ring, comprising a split ring, having at its ends integral retaining-heads, shaped as frustums of cones, a hub having its ends tapered outwardly and tightly embracing said retaining-heads, and an eye carried by said hub and depending therefrom, as set forth.

3. A curtain-pole ring, comprising a split ring having at its ends integral retaining-heads, shaped as frustums of cones, a hub having its ends tapered outwardly and tightly embracing said retaining-heads, and an eye carried by said hub and depending therefrom, the ends of said eye extending through apertures in the hub at the middle thereof, and the inner portions of the ends of said eye being bent in opposite directions, as set forth.

4. A curtain-pole ring, comprising a split ring having at its ends integral retaining-heads, shaped as frustums of cones, a hub having its ends tapered outwardly and tightly embracing said retaining-heads, and an eye carried by said hub and depending therefrom, the ends of said eye extending through apertures in the hub at the middle thereof, and the inner portions of the ends of said eye being bent in opposite directions, and following the inner surface of said hub to the upper portion of the hub and extending between the edges of the retaining-heads to form stops for said heads, as set forth.

In testimony whereof I have signed my name to this specification in the presence of two subscribing witnesses.

JOHN KRODER.

Witnesses:
  THEO. G. HOSTER,
  EVERARD BOLTON MARSHALL.